United States Patent [19]

Phillips

[11] Patent Number: 4,712,044

[45] Date of Patent: Dec. 8, 1987

[54] CIRCUIT FOR SEQUENTIALLY TURNING ON LAMPS ON AN AUTOMOBILE

[76] Inventor: Mark S. Phillips, 510 Budd Ave., Campbell, Calif. 95008

[21] Appl. No.: 810,108

[22] Filed: Dec. 17, 1985

[51] Int. Cl.[4] .............................................. B60Q 1/02
[52] U.S. Cl. ....................................... 315/82; 315/77; 307/10 LS; 340/82
[58] Field of Search ............... 340/67, 82; 307/10 LS; 315/77, 82

[56] References Cited

U.S. PATENT DOCUMENTS

| | | | |
|---|---|---|---|
| 3,484,626 | 12/1969 | Grafham | 340/82 |
| 3,582,980 | 6/1971 | Marks | 340/82 |
| 3,593,276 | 7/1971 | Schuler | 340/82 |
| 3,641,490 | 2/1972 | Kawai | 340/82 |
| 3,984,810 | 10/1976 | Hudson | 340/82 |

*Primary Examiner*—Harold Dixon
*Attorney, Agent, or Firm*—Kenneth E. Leeds; Alan H. MacPherson; Paul J. Winters

[57] ABSTRACT

An array of indicator lamps is mounted on the rear of an automobile for signaling turns. When a turn is signaled, the lamps turn on in sequence, thereby creating the impression of motion in the desired direction. Each lamp is coupled to a battery via an associatd relay switch. A control circuit closes the relay switches in sequence, thereby turning on the lamps in sequence. The control circuit includes a set of flip-flops, each relay switch closing in response to an associated one of the flip-flops, which change state in response to a clock signal.

10 Claims, 4 Drawing Figures

FIG. 4

CIRCUIT FOR SEQUENTIALLY TURNING ON LAMPS ON AN AUTOMOBILE

BACKGROUND OF THE INVENTION

1. Field of the Invention

This invention relates to circuits for controlling lamps on an automobile and more specifically to circuits for sequentially turning on a set of lamps in order to signal a turn.

2. Description of the Prior Art

It is known in the art to use an array of lamps on an automobile to signal a turn. For example, on some automobiles, the turn indicators include a first array of three lamps to signal a left turn and a second array of three lamps to signal a right turn. The first and second arrays are typically mounted on the rear of the automobile. When signaling a left turn, the lamps in the first array flash in sequence, the innermost lamp turning on first followed by the adjacent lamp within the first array followed by the outermost lamp within the first array. This results in an impression of a moving signal in the direction of the intended turn of the automobile. The second array of lamps operates in a similar manner to signal a right turn.

There are a number of prior art circuits for controlling lamps providing turn signals of this nature. Such circuits are described in U.S. Pat. No. 3,500,312 issued to Donald Stankovich and U.S. Pat. No. 3,582,980 issued to Peter M. Marks. The Marks and Stankovich circuits include a bi-metallic switching element which periodically opens and closes. The switching element is coupled to a first lamp and a delay circuit, the delay circuit having a lead coupled to a second lamp and a lead coupled to a third lamp. When the bi-metallic switching element closes, the first, second and third lamps turn on in sequence. When the bi-metallic switching element opens, all the lamps turn off simultaneously.

Unfortunately, in a circuit of this type, there is a limit to the number of lamps which may be turned on in sequence because the sum of the delays between each lamp turning on must be less than the total on-time of the bi-metallic switching element.

SUMMARY

A circuit constructed in accordance with my invention includes first and second arrays of lamps on an automobile for signaling left and right turns, respectively. In one embodiment, the first and second arrays of lamps are mounted on the rear of the automobile. Each lamp within the first array of lamps is selectively coupled to an associated switch, each of the associated switches sequentially closing when a left turn is being signaled, thereby illuminating each lamp within the first array of lamps in sequence.

When a left turn is not being signaled, the first array of lamps is decoupled from the associated switches and serves as a brake signal indicator. The second array of lamps is similarly coupled to the switches to either signal a right turn or to serve as a brake signal indicator.

In one embodiment, each of the switches is controlled by an associated flip-flop within a set of flip-flops. When a turn is not being signaled, each flip-flop is set to a first state, which causes each of the switches to open. When a turn is signaled, each flip-flop sequentially assumes a second state, causing the associated switch to close. After all of the flip-flops are in the second state, the flip-flops then assume the first state, thereby causing each of the switches to open, and the cycle repeats. In one embodiment, the flip-flops receive a clock signal from a clock signal generator.

In one embodiment, the circuit includes dashboard lamps indicating whether a turn is being signaled. The dashboard lamps typically turn on and off in response to a bi-metallic switching element. Of importance, the cycle times of the first and second arrays of lamps need not be synchronized with the bi-metallic switching element.

As a unique feature of this invention, when a malfunction such as a short circuit occurs in the circuit, turns can still be signaled. Specifically, when a short circuit develops in this flip-flops or the circuit elements controlling the switches, a fuse is blown within the circuit. When this happens, if a left turn is signaled, the first array of lamps turns on and off in response to the bi-metallic switching element, and if a right turn is signaled, the second array of lamps turns on and off in response to the bi-metallic switching element. Thus, a malfunction in the circuit of the present invention does not prevent the automobile drive from signaling turns.

Some prior art circuits illuminate signal lamps in unison rather than illuminating signal lamps sequentially. It will be appreciated by those skilled in the art, in light of the teachings of the present specifications, that these prior art circuits can be retrofitted by adding a control circuit contructed in accordance with one embodiment of my invention. The control circuit in this embodiment is enabled in response to the voltage across one of the other turn signal lamps on the automobile

BRIEF DESCRIPTION OF THE DRAWINGS

FIGS. 1a, 1b and 2 schematically illustrate a circuit constructed in accordance with my invention for controlling turn signal lamps on an automobile.

FIG. 1 illustrates the manner in which FIGS. 1a and 1b are to be placed relative to one another.

FIG. 3 illustrates a circuit for detecting a drop in battery output voltage in an automobile.

DETAILED DESCRIPTION

Figures 1, 1B, 3:
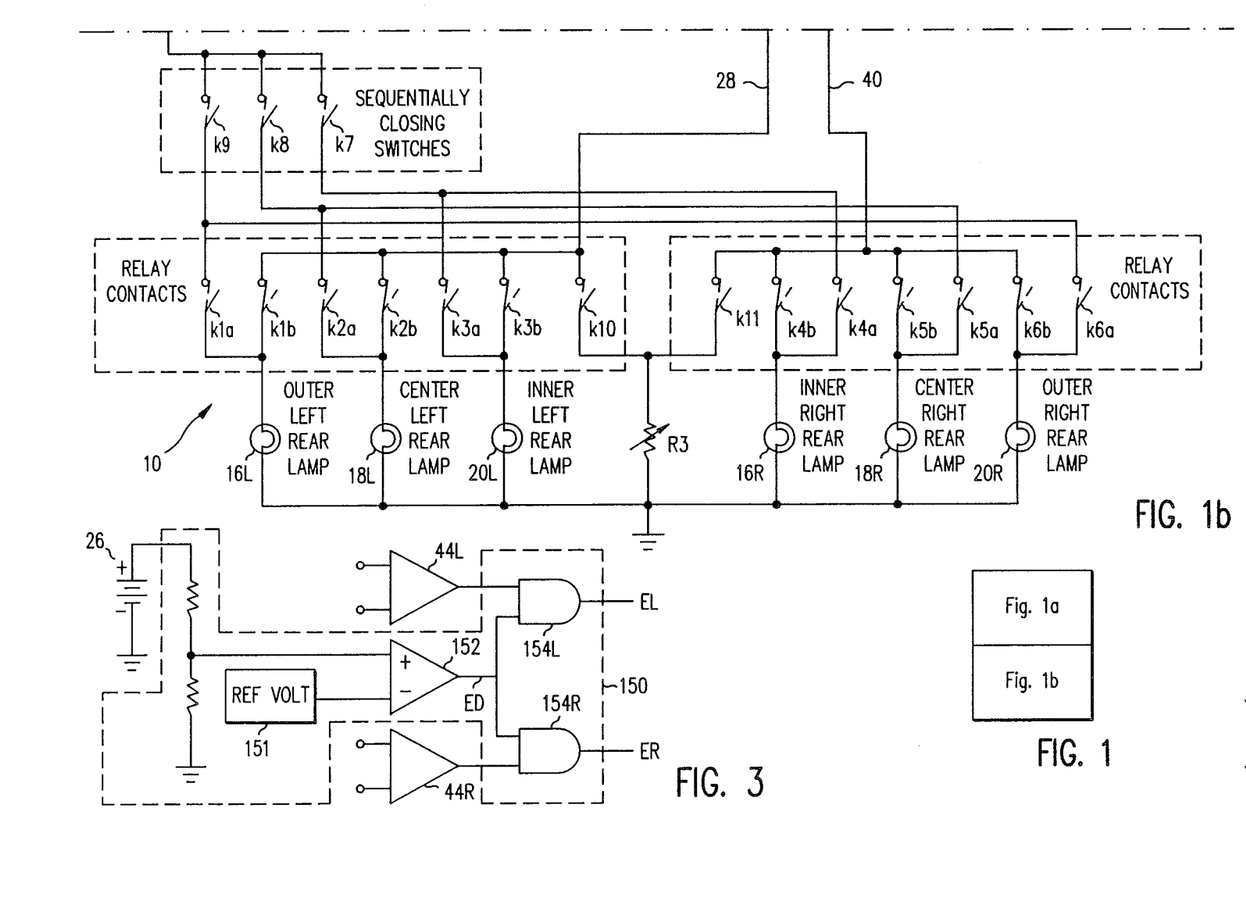
Figure 1A:
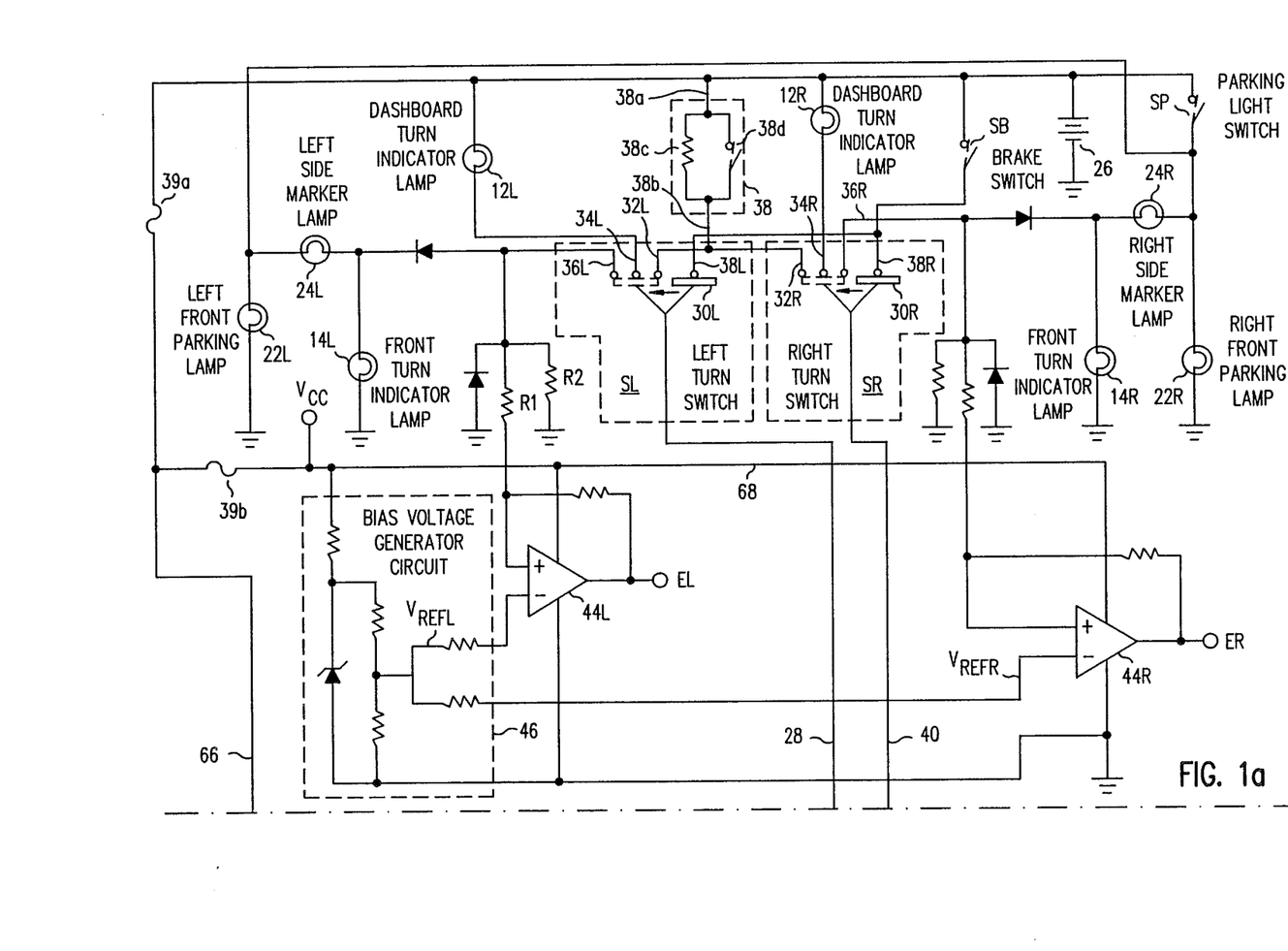
Figure 4:
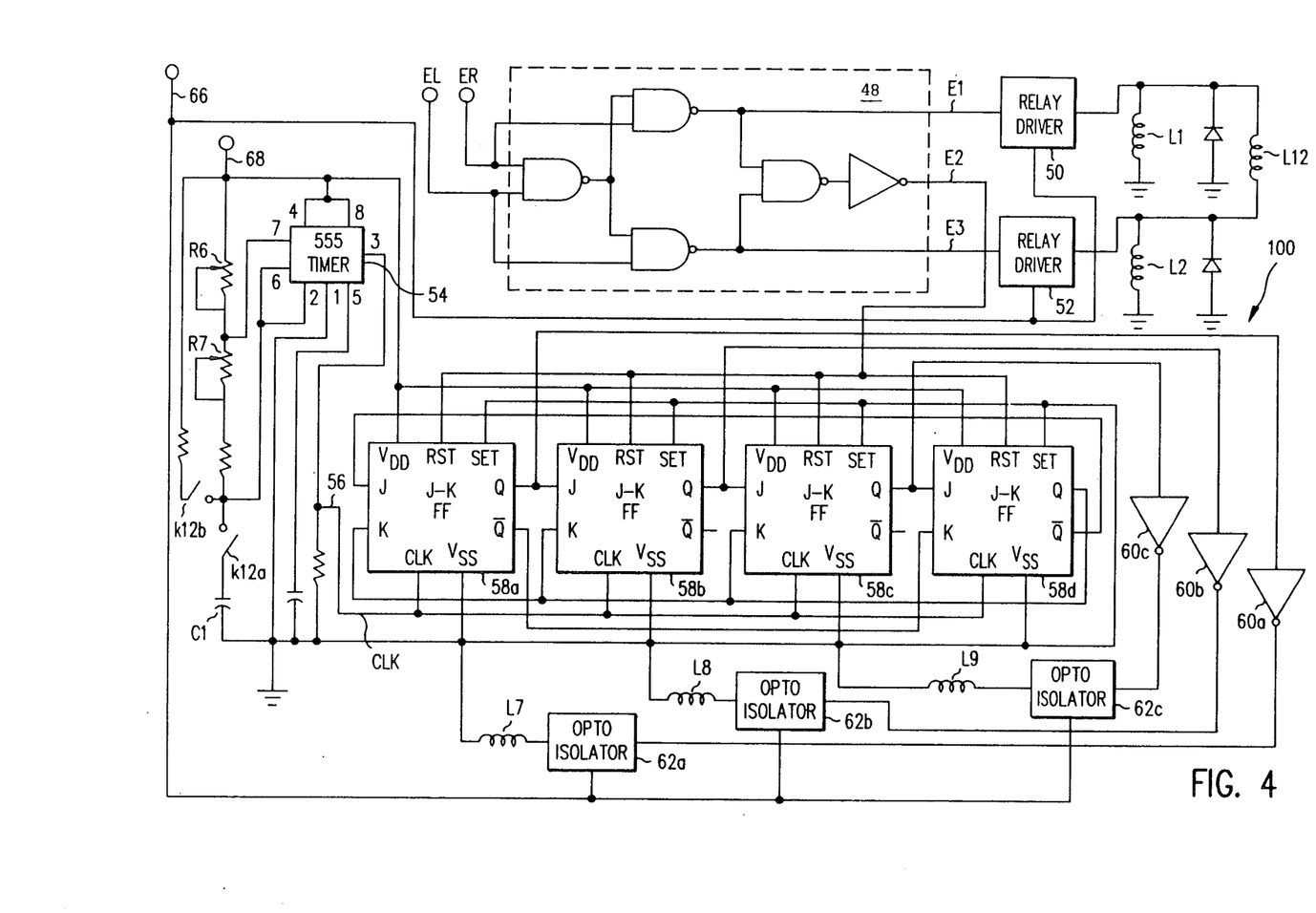

FIGS. 1a and 1b illustrate a circuit 10 for controlling lamps in an automobile constructed in accordance with my invention. The circuit of FIGS. 1a and 1b includes left and right turn dashboard indicator lamps 12L and 12R, left and right turn front indicator lamps 14L and 14R, an array of lamps 16L, 18L, 20L and an array of lamps 16R, 18R and 20R. Lamps 16R, 18R, 20R, 16L, 18L and 20L are typically mounted on the rear of the automobile and serve as brake lights and turn indicators. Also illustrated in FIGS. 1a and 1b are front parking lamps 22L and 22R and side marker lamps 24L and 24R. (In one embodiment, lamps 14L and 22L are filaments of a single bi-filament lamp and lamps 14R and 22R are filaments of a single bi-filament lamp.)

Circuit 10 includes manually activated switches SL and SR for signalling left and right turns, respectively. When a left turn is signaled, switch SL is positioned so that a switch terminal 30L is in electrical contact with terminals 32L, 34L and 36L. When a left turn is not signaled, switch terminal 30L is in electrical contact with a terminal 38L and not in electrical contact with terminals 32L, 34L and 36L. Switch SR operates in the same manner as switch SL.

OPERATION OF THE CIRCUIT WHEN A TURN IS NOT SIGNALED

When a turn is not signaled, a set of relay switches K1b to K6b are closed and a set of relay switches K1a to K6a are open. Relay switches K7 to K11 are also open. (Relay switches K1a to K6a, K1b to K6b, and K7 to K11 are controlled by a control circuit 100 illustrated in FIG. 2 described below. Switches K1a to K6a, K1b to K6b, and K7 to K11 are drawn to indicate the position they assume when a turn is not being signaled. The switch position shown in phantom indicates the position they assume when a turn is being signaled. Switches SL and SR are similarly illustrated.) Below terminal 30L of switch SL is in contact with terminal 38L, lamps 16L to 20L are coupled in series with a brake switch SB, and therefore function as brake indicator lights. Similarly, because terminal 30R of switch SR electrically contacts terminal 38R, lamps 16R to 20R also function as brake indicator lights.

Of importance, because terminals 34L and 34R are not connected to terminals 30L and 30R, dashboard turn indicator lamps 12L and 12R are off.

Also illustrated in FIG. 1a is a manually actuated parking light switch SP connected between a battery 26 and running light indicator lamps 22L and 22R. In addition, switch SP is connected to and controls side marker lamps 24L and 24R, respectively. Therefore, when switch SP is closed, side marker lamps 24L and 24R turn on. However, because the impedance of lamp 24L is much greater than the impedance of lamp 14L, lamp 14L does not illuminate when switch SP closes. Similarly, because of the impedance of lamp 24R relative to lamp 14R, lamp 14R does not illuminate when switch SP closes.

Circuit 10 includes comparators 44L and 44R for providing binary signals EL and ER, respectively, indicative of the state of switches SL and SR, respectively. Signals EL and ER are received by control circuit 100 (FIG. 2), which controls relay switches K1a to K6a, K1b to K6b and K7 to K11 in response thereto, as described in detail below.

A circuit 46 provides voltages $V_{REFL}$ and $V_{REFR}$ on the inverting input leads of comparators 44L and 44R, respectively. Voltages $V_{REFL}$ and $V_{REFR}$ are typically about 128 mV. The noninverting input lead of comparator 44L is coupled to terminal 36L via a resistor R1. In addition, the noninverting input lead of comparator 44L is grounded through resistors R1 and R2. Because of this, signal EL is low. Of importance, a diode D1 coupled between lamp 24L and terminal 36L prevents current from flowing from lamp 24L to the noninverting input lead of comparator 44L and affecting the state of comparator 44L. It is noted that comparator 44R operates in a manner similar to that of comparator 44L and will not be described in detail.

OPERATION WHEN A LEFT TURN IS SIGNALED

Operation of circuit 10 when a left turn is signaled will be described, it being understood that circuit 10 operates in a similar manner when a right turn is signaled.

When switch SL is actuated, terminal 30L comes into electrical contact with terminals 32L, 34L and 36L. A small current is thus permitted to flow from battery 26, through resistive filament 38c within bi-metallic switching element 38, diode D1 and lamp 14L. The voltage at terminal 36L thus increases, causing output signal EL to go high. (It is noted that when switch SL is actuated, lead 36L is also coupled to battery 26 via lead 34L and lamp 12L. Current flow through this path also serves to increase the voltage at lead 36L.) Control circuit 100 (FIG. 2) receives signal EL and causes relay switches K1a to K3a and K10 to close and causes relay switches K1b to K3b to open. The manner in which this is done is described below. Because relay switches K1a to K3a are closed, lamps 16L, 18L and 20L are connected to relay switches K7, K8 and K9, respectively. Relay switches K7 to K9 are connected to battery 26 via a lead 66 and a fuse 39a.

When a left turn is signaled, relay switches K7, K8 and K9 close, in that order, causing lamps 20L, 18L and 16L to turn on, in that order, thereby creating the impression of motion in the direction of the indicated turn. After relay switches K7 to K9 are closed, switches K7 to K9 open and the cycle is repeated. As mentioned above, relay switches K7 to K9 are controlled by circuit 100 of FIG. 2 described below.

Switching element 28 periodically opens and closes when a turn is signaled. In one embodiment, switching element 38 is device number 536 available from Sylvania. Switching element 38 has a first terminal 38a connected to battery 26 and a second terminal 38b connected to ground via a switch SL, a line 28, relay switch K10 and a variable resistor R3. Terminal 38b is also connected to ground via terminal 36L, diode D1 and lamp 14L. Current through filament 38c within switching element 38 causes the temperature of filament 38c to increase. When filament 38c reaches a predetermined temperature, a switch 38d within switching element 38 closes, and current no longer flows through filament 38c. As filament 38c cools, switch 38d opens and current again flows through filament 38c. Thus, switch 38d opens and closes and at a predetermined rate dependent upon the current through filament 38c, which in turn depends on the resistance of variable resistor R3 and lamp 14L. It is noted that because the resistance of resistor R3 is adjustable, the switching frequency of switch 38d and therefore lamps 12L and 14L can be adjusted. It is also noted that even with switch 38d open, current through filament 38c is sufficient to cause comparator 44L to drive signal EL high. This would be true even if not current flowed through lamp 12L (e.g. if lamp 12L was burnt out).

Dashboard left turn indicator lamp 12L is connected in parallel with switching element 38. When switch 38d is closed, there was zero volts across lamp 12L and therefore lamp 12L is off. When switch 38d is open, current flows from battery 26 through lamp 12L and to ground through both a first current path including line 28, relay switch K10 and resistor R3, and a second current path including diode D1 and lamp 14L. In this way, the opening and closing of switching element 38 turns lamp 12L on and off.

As mentioned above, when switch 38d is closed, lamp 14L is connected to batter 26 via diode D1 and switch 38d, thereby causing lamp 14L to illuminate. When switch 38d opens, lamp 14L is connected to battery 26 via diode D1 and lamp 12. Because lamp 12L has a high impedance relative to lamp 14L, lamp 14L is unilluminated when switch 38d is open. Therefore, lamp 14L turns on and off in response to switching element 38.

At the end of the turn, terminal 30L is decoupled from terminals 32L, 34L and 36L, and is coupled to terminal 38L. This causes signal EL to go low, which causes control circuit 100 to open relay switches K1a to K3a and K7 to K10, and close relay switched K1b to K3b.

CONTROL CIRCUIT 100

FIG. 2 schematically illustrates control circuit 100 for opening and closing relay switches K1a to K6a, K1b to K6b, and K7 t K11. Specifically, the circuit of FIG. 2 includes coils L7, L8 and L9 for controlling the state of relay switches K7, K8 and K9 respectively. When current flows through coil L7, relay switch K7 closes and when no current flows through coil L7, relay switch K7 opens. Coils L8 and L9 similarly control relay switches K8 and K9. Also illustrated is a coil L1 which controls the state of relay switches K1a to K3a, K1b to K3b and K10. When current flows through coil L1, relay switches K1a to K3a and K10 are closed and relay switches K1b to K3b are open. Similarly, when not current flows through coil L1, relay switches K1a to K3a and K10 are open and relay switches K1b to K3b are closed. Similarly, when current flows through coil L2, relay switches K4a to K6a and K11 relay are closed and switches K4b to K6b are open. When no current flows through coil L2, and relay switches K4a to K6a and K11 are open and relay switches K4b to K6b are closed. Circuit 100 controls the current through coils L1, L2 and L7 to L9 in response to signals EL and ER generated by comparators 44L and 44R (FIG. 1a).

Signals EL and ER are presented to a logic circuit 48 which generates therefrom signals E1, E2 and E3 respectively as indicated in Table 1 below.

switch K12a to close. When this happens, clock circuit 54 generates a clock signal CLK on a clock signal line 56. The period of clock signal CLK can be adjusted by modifying the resistance of variable resistors R6 and R7. In one embodiment, these values are selected to provide a period of about 0.4 to 1.0 seconds Clock signal CLK is presented to a set of flip-flops 58a through 58d. The Q output signal of flip-flops 58a, 58b and 58c are presented to inverting buffers 60a, 60b and 60c, respectively, which in turn drive opto-isolator circuits 62a through 62c respectively. Opto-isolator circuits 62a to 62c provide current through coils L7 to L9, respectively, in response to low signals from inverters 60a to 60c, respectively. In this way, flip-flops 58a and 58c control the state of relay switches K7, K8 and K9, respectively.

Initially, signals EL and ER are both low and therefore signals E1, E2 and E3 are all high. As mentioned above, because of this, clock circuit 54 is disabled. In addition, because signal E2 is high, and signal E2 is presented to the reset input leads of flip-flops 58a to 58d, the Q output signals of flip-flops 58a to 58d are all low, and switches K7 to K9 are all open. When a left turn is signaled, signal EL goes high, causing signals E2 and E3 to go low. Therefore, flip-flops 58a to 58d no longer receive a reset signal. Further, because signal E3 goes low, current flows through coils L2 and L12, causing relay switches K1a to K3a and K10 to close and relay switches K1b to K3b to open. In addition, because of the current flowing through coil L12, switch K12b opens and switch K12a closes thereby permitting clock

TABLE 1

| EL | ER | E1 | E2 | E3 | Switches K1a to K3a | Switches K1b to K3b | Switches K4a to K6a | Switches K4b to K6b | Switch K10 | Switch K11 | Switch k12a | Switch K12b |
|---|---|---|---|---|---|---|---|---|---|---|---|---|
| 0 | 0 | 1 | 1 | 1 | OPEN | CLOSED | OPEN | CLOSED | OPEN | OPEN | OPEN | CLOSED |
| 0 | 1 | 0 | 0 | 1 | OPEN | CLOSED | CLOSED | OPEN | OPEN | CLOSED | CLOSED | OPEN |
| 1 | 0 | 1 | 0 | 0 | CLOSED | OPEN | OPEN | CLOSED | CLOSED | OPEN | CLOSED | OPEN |
| 1 | 1 | 1 | 1 | 1 | ILLEGAL | | | | | | | |

Signals E1 and E3 are presented to inverting relay driver buffers 50 and 52, respectively, which provide current for coils L1 and L2 respectively. For example, when signal ER is high, signal E1 is low and relay drive 50 provides current for coil L1. In addition, relay driver 50 provides current for coil L12 which operates switches K12a and K12b, the function of which will be described in greater detail below. Similarly, when signal EL is high, signal E3 is low and relay drive 52 provides current for coil L2 and L12. In this way, signals EL and ER are used to control the state of switches K1a to K6a, K1b to K6b, K10, K11, K12a and K12b.

In one embodiment, the impedance of coil L12 is greater than the impedance of coil L1 and L2. Therefore, if the output voltage of relay driver 50 is high, the voltage across coil L12 is sufficient to actuate switches K12a and K12b, but the voltage across coil L2 is insufficient to actuate switches K4a to K6a or K4b to K6b. Similarly, if the output voltage from relay driver 52 is high, the voltage across coil L1 will not will not actuate switches K1a to K3a or K1b to K3b.

Circuit 100 includes a clock circuit 54 which in one embodiment is an integrated circuit such as part number 555 available from Signetics. When signals EL and ER are both low, there is no current flowing through coil L12, relay switch K12a is open and relay switch K12b is closed. This disables clock circuit 54. When either signal EL or ER is high, current flows through coil L12 which causes relay switch K12b to open and relay circuit 54 to generate clock signal CLK on lead 56.

The J input lead of flip-flop 58a receives the $\overline{Q}$ of flip-flop 58d. Because flip-flop 58d has been previously reset, the $\overline{Q}$ output signal is high and therefore on the first rising edge of clock signal CLK, the Q output signal of flip-flop 58a goes high which in turn causes current to flow through coil L7, closing relay switch K7. At the next rising edge of clock signal CLK, because the Q output signal from flip-flop 58a is coupled to the J input lead of flip-flop 58b, flip-flop 58b changes state and the Q output signal from flip-flop 58b goes high, causing current to flow through coil L8, which in turn closes relay switch K8. On the next rising edge of clock signal CLK, because the Q output signal from flip-flop 58b is coupled to the J input lead of flip-flop 58c, flip-flop 58c changes state and causes current to flow through coil L9 which closes relay switch K9. On the next rising edge of clock signal CLK, flip-flop 58d changes state causing the Q output signal of flip-flop 58d to go high and the $\overline{Q}$ output signal to go low. Because the Q output signal of flip-flop 58d is coupled to the K input lead of flip-flops 58a to 58c, on the next rising edge of clock signal CLK, the Q output signals of flip-flops 58a to 58c go low and relay switches K7 to K9 open. On the next rising edge of clock signal CLK, flip-flop 58d changes state again and the cycle repeats itself. This continues until signal EL goes low, which causes relay switch K12b to close and K12a to open, thereby disabling clock circuit 54. In addition, signal E2 goes high thereby resetting flip-flops 58a to 58d and turning off relay switches K7 to K9.

OPERATION OF CIRCUIT WHEN EITHER FUSE 39a OR 39b IS BLOWN

Of importance, opto-isolators 62a to 62c and relay drivers 50 and 52 are coupled to voltage supply lead 66, which is connected to battery 26 via fuse 39a (FIG. 1a). Similarly, logic circuit 48, flip-flops 58a to 58d, inverters 60a to 60c, and clock circuit 54 receive power from a voltage supply lead 68, which is coupled to voltage supply lead 66 via a fuse 39b. If either fuse 39a or 39b opens (e.g. because of a short circuit in control circuit 100), control circuit 100 is disabled, and current will not flow through coils L1 or L2. Thus, switches K1a to K6a K10 and K11 will be open and switches K1b to K6b will be closed. If a turn is not signaled, the circuit operates as described above, i.e. if brake switch SB is actuated, lamps 16L to 20L and 16R to 20R illuminate. However, if a left turn is signaled, lamps 16L to 20L will turn on and off in unison when switch 38d closes and opens, respectively. Thus, if control circuit 100 is disabled, turn signals will still function, although rear lamps 16L to 20L will not sequentially illuminate. Naturally, lamps 16R to 20R operate in a manner similar to lamps 16L to 20L when control circuit 100 fails.

DISABLE CIRCUIT 150

In another embodiment of my invention, a disable circuit 150 (FIG. 3) is coupled to battery 26 to detect a drop in voltage supplied by battery 26. If the voltage provided by battery 26 is too low for proper operation of control circuit 100 (FIG. 2), disable circuit 150 provides a signal ED which disables control circuit 100.

Control circuit 150 includes a reference voltage supply 151 which provides a reference voltage to a comparator 152. Comparator 152 compares this voltage with a voltage proportional to the output voltage of battery 26. In response thereto, comparator 152 provides disable signal ED to a pair of AND gates 154L and 154R. The output signals from comparators 44L and 44R are also coupled to AND gates 154L and 154R, respectively. (Comparators 44L and 44R are illustrated without any support circuit elements for simplicity).

When the voltage provided by battery 26 falls below a predetermined minimum, disable signal ED goes low, preventing signals EL and ER from going high. In this way, control circuit 100 is prevented from closing relay switches K1a to K6a or K7 to K11.

In other embodiments, other types of logic circuits prevent these relays from closing when the battery output voltage is insufficient for proper operation of control circuit 100.

While the invention has been described with respect to a specific embodiment, those skilled in the art will recognize that changes can be made in form and detail without departing from the spirit and scope of the invention. For example, instead of using JK flip-flops, D flip-flops are also appropriate. In addition, instead of using a clock circuit which uses an RC time constant to control the clock frequency, other types of clock signal generators can be used.

In addition, instead of using a switching element which is initially open and then closes in response to current though filament 38c, other types of switching elements can be used. For example, a switching element which is initially closed and then opens in response to current through the element can also be used. In such an embodiment, a resistor is coupled in parallel with the switching element to ensure that signal EL or ER remains high when the switching element opens.

In addition, in other embodiments, lamps 16L to 20L and 16R to 20R are bi-filament lamps. When a turn is not signaled, one filament is used as a running light and the other filament is used as a brake signal light. When a turn is signaled, the brake signal filaments are used to signal the turn. Accordingly, all such changes come within the scope of the present invention.

I claim:

1. A circuit for controlling lamps mounted on a vehicle comprising:
   a first lamp for indicating a turn;
   a manually actuatable switch for signaling a turn, said manually actuatable switch coupling said first lamp to a voltage source when a turn is signaled;
   means for sensing the voltage across said first lamp and generating a digital signal in response thereto when a turn is signaled;
   a plurality of flip-flops adapted to be in either a first state or a second state, said flip-flops sequentially assuming said second state and then assuming said first state after each of said flip-flops is in said second state in response to the presence of said digital signal; and
   a plurality of lamps turning on and off in response to the state of an associated one of said flip-flops.

2. The circuit of claim 1 wherein said means for sensing is a comparator for comparing the voltage across said first lamp with a reference voltage.

3. The circuit of claim 1 wherein said manually actuatable switch comprises first, second, and third terminals, said first terminal being coupled to said first lamp, said circuit further comprising:
   a second lamp coupled between said second terminal and said voltage source; and
   a second switch coupled between said third terminal and said voltage source, said second switch periodically opening and closing when said manually actuatable switch is actuated,
   and wherein said first second, and third terminals are coupled together when said manually actuatable switch is actuated, said first, second and third terminals being decoupled from each other when said manually actuatable switch is not actuated.

4. A circuit comprising:
   a plurality of lamps mounted on a vehicle for indicating a turn;
   a first control circuit for sequentially turning on each lamp within said plurality of lamps, thereby signaling a turn; and
   a second control circuit for periodically turning said lamps within said plurality of lamps on and off to signal a turn when said first control circuit malfunctions.

5. The circuit of claim 4 wherein said malfunctions is a blown fuse in said first control circuit.

6. The circuit of claim 4 wherein said malfunction is a short circuit in said first control circuit.

7. The circuit of claim 4 wherein said first control circuit comprises a plurality of flip-flops, each flip-flop sequentially assuming a first state, each flip-flop assuming a second state after all of said flip-flops are in said first state, each lamp within said plurality of lamps illuminating in response to an associated one of said flip-flops being in said first state.

8. The circuit of claim 4 wherein said second control circuit turns said lamps on and off in response to a bimetallic switching element closing and opening.

9. The circuit of claim 4 wherein said first control circuit receives a voltage from a voltage supply, said malfunction comprising a condition in which said voltage is below a predetermined minimum.

10. The circuit of claim 9 further comprising:
a comparator for providing a disable signal in response to said voltage falling below a predetermined minimum; and
means for disabling said first control circuit in response to said disable signal.

* * * * *

UNITED STATES PATENT AND TRADEMARK OFFICE
CERTIFICATE OF CORRECTION

PATENT NO. : 4,712,044

DATED : December 8, 1987

INVENTOR(S) : Mark S. Phillips

It is certified that error appears in the above-identified patent and that said Letters Patent is hereby corrected as shown below:

Col. 2, line 14, "this" should read --the--.

Col. 2, line 23, "drive" should read --driver--.

Col. 2, line 27, "specifications" should read --specification--.

Col. 3, line 14, "Below" should read --Because--.

Col. 3, line 67, after "through" insert --a--.

Col. 4, line 22, "element 28" should read --element 38--.

Col. 4, line 46, "not" should read --no--.

Col. 4, line 59, "batter" should read --battery--.

Col. 5, line 2, "switched" should read --switches--.

Col. 5, line 8, "t Kll" should read --to Kll--.

Col. 5, line 19, "not" should read --no--.

Col. 5, lines 43 and 48, "drive" should read --driver--.

UNITED STATES PATENT AND TRADEMARK OFFICE
CERTIFICATE OF CORRECTION

PATENT NO. : 4,712,044

DATED : December 8, 1987

INVENTOR(S) : Mark S. Phillips

It is certified that error appears in the above-identified patent and that said Letters Patent is hereby corrected as shown below:

Col. 6, line 14, "58a" should read --58a, 58b--.

Col. 6, line 34, "k12a" should read --K12a--.

Claim 5, Col. 8, line 58, "malfunctions" should read --malfunction--.

Signed and Sealed this

Twenty-third Day of January, 1990

Attest:

JEFFREY M. SAMUELS

Attesting Officer

Acting Commissioner of Patents and Trademarks